(12) United States Patent
Hicks

(10) Patent No.: US 10,801,626 B2
(45) Date of Patent: Oct. 13, 2020

(54) FLOATING BALL VALVE WITH IMPROVED VALVE SEAT

(71) Applicant: Michael Reece Hicks, Edmond, OK (US)

(72) Inventor: Michael Reece Hicks, Edmond, OK (US)

(73) Assignee: Emkade Distribution, Inc., Edmonton, AB (CA)

( * ) Notice: Subject to any disclaimer, the term of this patent is extended or adjusted under 35 U.S.C. 154(b) by 27 days.

(21) Appl. No.: 16/131,635

(22) Filed: Sep. 14, 2018

(65) Prior Publication Data

US 2019/0085986 A1 Mar. 21, 2019

Related U.S. Application Data

(60) Provisional application No. 62/558,993, filed on Sep. 15, 2017.

(51) Int. Cl.
*F16K 5/06* (2006.01)

(52) U.S. Cl.
CPC .............. *F16K 5/06* (2013.01); *F16K 5/0668* (2013.01); *F16K 5/0689* (2013.01)

(58) Field of Classification Search
CPC ........ F16K 5/06; F16K 5/0663; F16K 5/0668; F16K 5/0689; F16K 5/0642; F16K 5/0673; F16K 5/0678
See application file for complete search history.

(56) References Cited

U.S. PATENT DOCUMENTS

| | | | |
|---|---|---|---|
| 3,345,032 A | 10/1967 | Rawstron | |
| 3,347,517 A | 10/1967 | Scaramucci | |
| 3,356,333 A * | 12/1967 | Scaramucci | F16K 5/0668 251/172 |
| 3,357,679 A | 12/1967 | Scaramucci | |
| 3,397,861 A | 8/1968 | Scaramucci | |
| 3,398,926 A | 8/1968 | Scaramucci | |
| 3,408,038 A | 10/1968 | Scaramcci | |
| 3,462,120 A | 8/1969 | Priece | |
| 3,649,035 A | 3/1972 | Graham | |
| 4,247,080 A | 1/1981 | Morrison | |
| 4,552,335 A | 11/1985 | Alexander et al. | |
| 5,062,452 A | 11/1991 | Johnson | |
| 5,275,204 A | 1/1994 | Rogers et al. | |

(Continued)

FOREIGN PATENT DOCUMENTS

GB 1219506 A * 1/1971 ........... F16K 5/0668

OTHER PUBLICATIONS

International Search Report and Written Opinion issued in connection with corresponding PCT Application No. PCT/US2018/51097 dated Jan. 3, 2019.

*Primary Examiner* — Hailey K. Do
(74) *Attorney, Agent, or Firm* — Crowe & Dunlevy, P.C.

(57) ABSTRACT

A ball valve includes a valve body, a ball chamber within the valve body and a valve ball within the ball chamber. The ball valve further includes valve seats in contact with the valve ball. Each valve seat includes a front face, a rear face and an outer face. The front face includes two or more low pressure contact rings and two or more high pressure contact rings that provide enhanced sealing against the valve ball under both high and low pressure conditions. The rear and outer face each include independent seal zones.

19 Claims, 8 Drawing Sheets

(56) References Cited

U.S. PATENT DOCUMENTS

| | | |
|---|---|---|
| 6,880,806 B2 | 4/2005 | Haikawa et al. |
| 8,210,499 B2 | 7/2012 | Madden et al. |
| 2010/0200791 A1 | 8/2010 | Yung et al. |
| 2012/0112110 A1 | 5/2012 | Lewandowski et al. |
| 2016/0153574 A1* | 6/2016 | Kothadia .............. F16K 5/0642 251/315.01 |

* cited by examiner

FLOATING BALL VALVE WITH IMPROVED VALVE SEAT

RELATED APPLICATIONS

This application claims the benefit of U.S. Provisional Patent Application Ser. No. 62/558,993 filed Sep. 15, 2017 entitled "Floating Ball Valve with Improved Valve Seat," the disclosure of which is herein incorporated by reference.

FIELD OF THE INVENTION

This invention relates generally to ball valves, and more particularly, but not by way of limitation, to an improved valve seat for a ball valve or any valve utilizing a spherical surfaced closure mechanism.

BACKGROUND

For many years, ball valves have been used in control applications in a large variety of industrial applications. Generally, a ball valve includes a valve body and a rotatable valve ball. The valve ball includes a central port that permits fluid flow through the valve body when the valve ball is rotated into an open position. When the valve ball is rotated into a closed position, the central port is no longer aligned with the inlet and outlet of the valve body and flow is blocked. The rotational position of the valve ball is typically manipulated with a handle that is connected to the valve ball with a valve stem. Most ball valves are intended for bidirectional fluid flow, such that the inlet and outlet of the valve body may be interchangeable.

To prevent leakage around the closed valve ball, valve seats are placed in the valve body in contact with valve ball. Valve seats may be manufactured from metal alloys, polymers and ceramics. Prior art valve seats tend to include a substantially smooth sealing face that matches the exterior contour of the valve ball. In other designs, the valve seat may include a series of grooves that are intended to capture particulates that might otherwise accelerate wear if trapped against the face of the valve seat.

Some prior art valve seats seal effectively under elevated pressures, but perform poorly under lower pressures. In particular, the upstream valve seat may lose a sealing interface with the valve ball when pressure forces the valve ball to deflect downstream within the valve body. The reduced sealing capacity of the upstream valve seat may permit particulates to become entrapped within or behind the upstream valve seat, thereby accelerating wear on the valve seat and increasing torque required to open and close the valve. Particulates as well as normal wear of the seat play a role in degrading and compromising the valve seat's ability to isolate pressurized and flowing fluids between the upstream and downstream connections. Redundant sealing features are critical in extending the useful life of a valve seat. There is, therefore, a need for an improved valve seat design that seals effectively under both high and low pressures and provides redundant sealing surfaces. It is to these and other objectives that the present invention is directed.

SUMMARY OF THE INVENTION

In one embodiment, the present invention includes a ball valve that has a valve body, a ball chamber within the valve body and a valve ball within the ball chamber. The valve ball has an outer surface and a central port extending through the valve ball. The ball valve further includes a valve seat in contact with the outer surface of the valve ball. The valve seat has a front face, a rear face and an outer face. The front face includes two or more low pressure contact rings and two or more high pressure contact rings.

In another aspect, the present invention includes a ball valve that has a valve body, a ball chamber within the valve body and a valve ball within the ball chamber. The valve ball has an outer surface and a central port extending through the valve ball. The ball valve further includes a valve seat in contact with the outer surface of the valve ball. The valve seat has a front face, a rear face and an outer face. The front face includes at least one low pressure contact ring and at least one high pressure contact ring. The at least one low pressure contact ring and at least one high pressure contact ring extend off the front face at different heights.

In yet another aspect, the present invention includes a ball valve that has a valve body, a valve ball and an upstream valve seat. The valve body has a ball chamber, an upstream valve seat pocket and a downstream valve seat pocket. The valve ball is contained within the ball chamber and the valve ball includes an outer surface and a central port extending through the valve ball. The upstream valve seat is located in the upstream valve seat pocket and is in contact with the outer surface of the valve ball. The upstream valve seat has a front face, a rear face, an outer face and a rear corner. The front face has two or more low pressure contact rings and two or more high pressure contact rings. The rear face and the outer face extend away from the rear corner at an obtuse angle such that the rear corner is spaced apart from the upstream valve seat pocket.

WRITTEN DESCRIPTION

Figure 1:
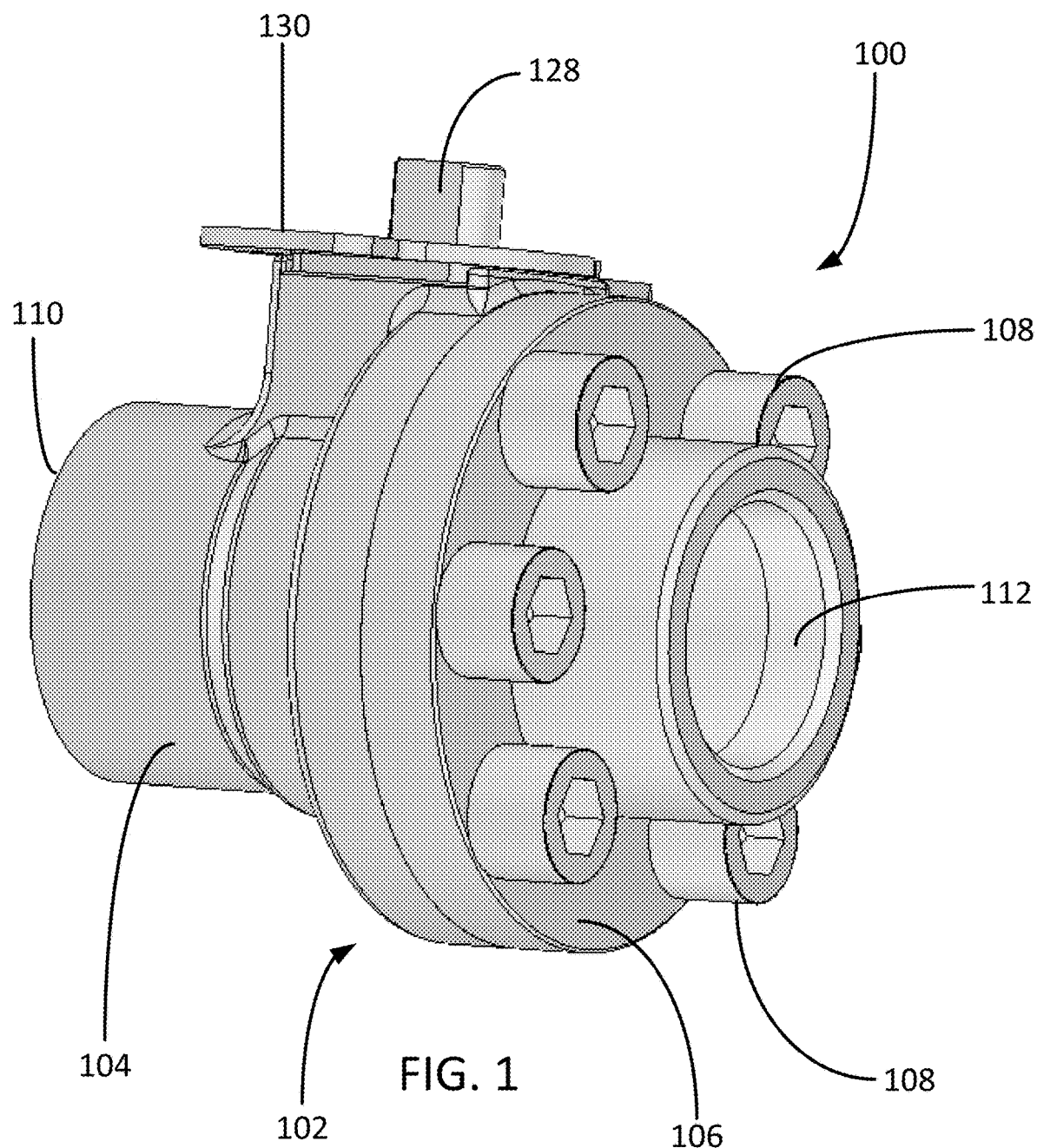
FIG. 1 is a perspective view of a ball valve constructed in accordance with an exemplary embodiment.
Figure 2:
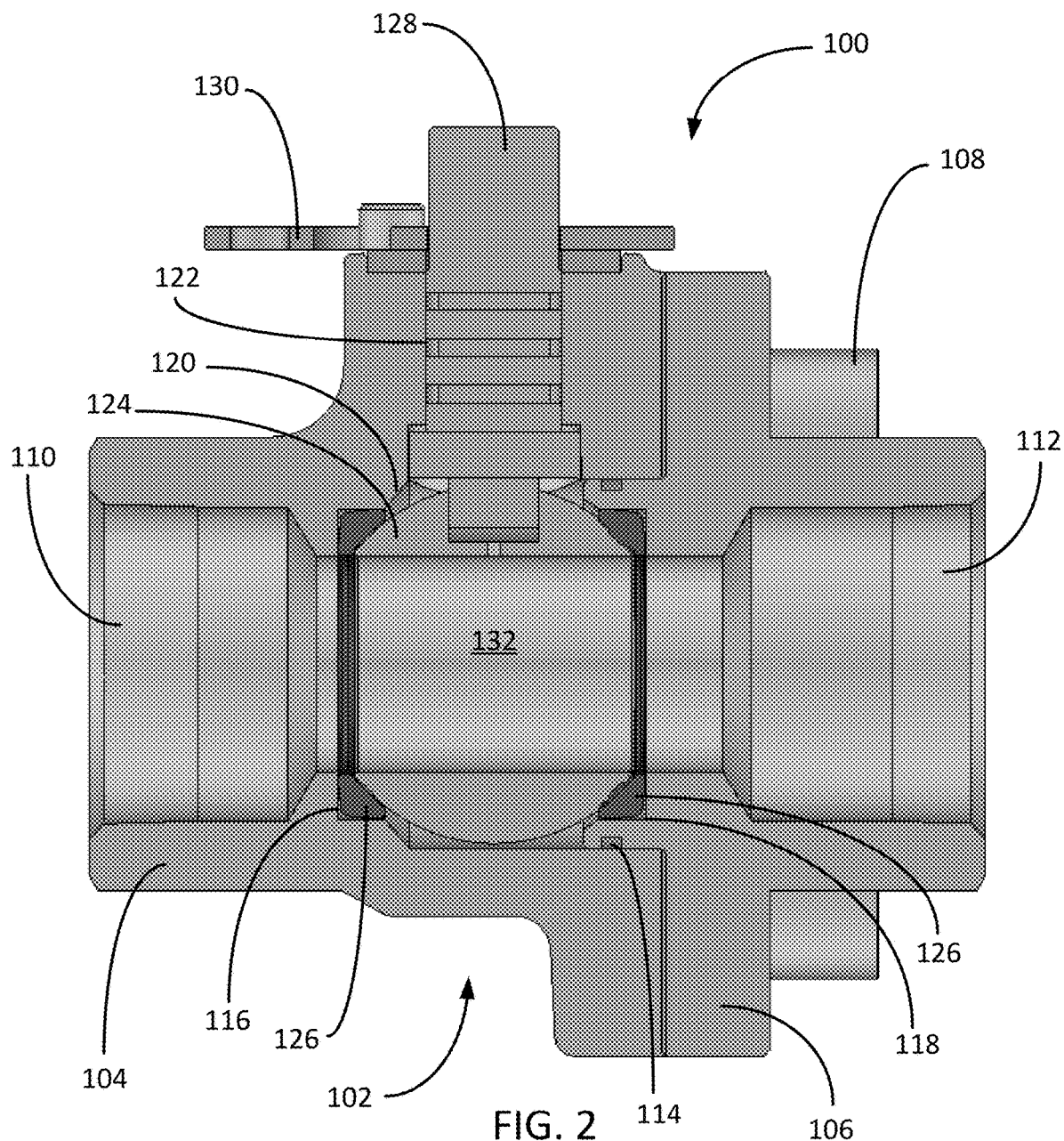
FIG. 2 is a cross-sectional view of the ball valve of FIG. 1.

Referring first to FIGS. 1 and 2, shown therein are perspective and cross-sectional views, respectively, of a ball valve 100 constructed in accordance with exemplary embodiments of the present invention. The ball valve 100 includes a two-piece valve body 102 that has a first side 104 and a second side 106. The first side 104 and second side 106 can be held together with fasteners 108. In some embodiments, the first side 104 and second side 106 are configured for a mating threaded engagement.

The first and second sides 104, 106 include fluid connections 110, 112, respectively. It will be appreciated that the ball valve 100 is configured for bidirectional fluid flow, such that fluid may enter the ball valve from either the first side 104 or the second side 106. Accordingly, as used in this disclosure, the relative positions of components within the ball valve 100 will be described in terms of "upstream" or "downstream" based on the direction of fluid flow through the ball valve 100. A valve body seal 114 may be included between the first and second sides 104, 106 of the ball valve 100.

The first and second sides 104, 106 include valve seat pockets 116, 118, respectively. The first and second sides 104, 106 also cooperate to define an interior ball chamber 120. As illustrated in FIG. 2, the valve seat pockets 116, 118 are contiguous with the ball chamber 120. The first side 104 also includes a valve stem chamber 122 that provides access to the ball chamber 120.

The ball valve 100 also includes a valve ball 124, first and second valve seats 126, valve stem 128 and a position stop 130. The valve stem 128 extends from the position stop 130 through the valve stem chamber 122 to the valve ball 124. Although the valve stem 128 can be manually-operated via a handle or wrench, it will be appreciated that the valve stem 128 can also be an automated via a motorized control valve.

Figure 3:
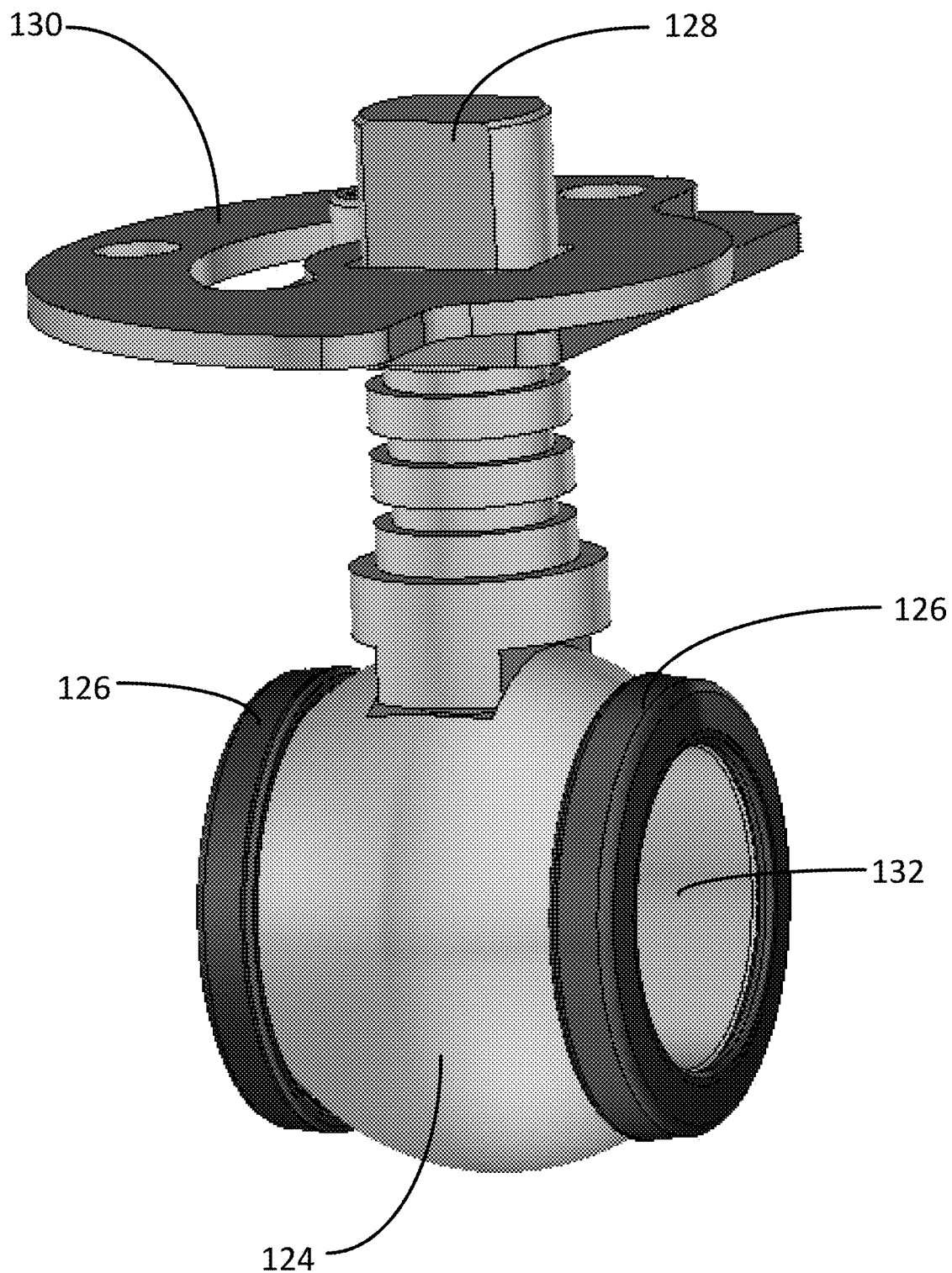
FIG. 3 is a perspective view of the valve ball, valve seats, valve stem and handle of the ball valve of FIG. 1.
Figure 4:
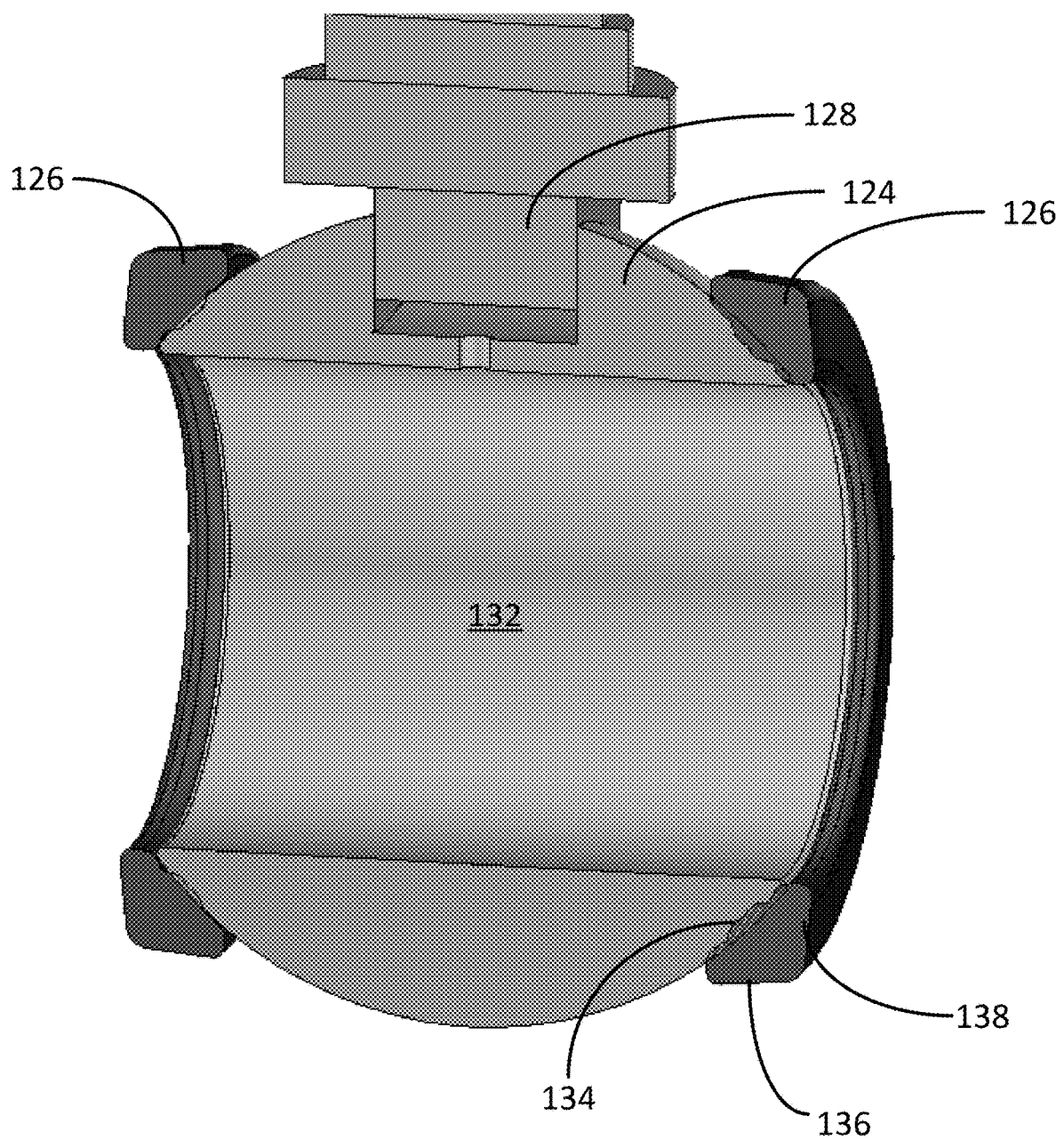
FIG. 4 is a partial cross-sectional view of the valve ball and valve seats.

The first and second valve seats 126 are positioned within the first and second valve seat pockets 116, 118. Unless otherwise indicated, the first and second valve seats 126 are similar or substantially identical. The valve ball 124 is captured in the ball chamber 120 between the first and second valve seats 126. The valve ball 124 includes a central port 132 that permits fluid flow between the first and second fluid connections 110, 112 when the valve ball 124 is rotated into a position in which the central port 132 is axially aligned with the first and second fluid connections 110, 112 (as depicted in FIG. 2). When the valve ball 124 is rotated approximately 90°, the central port 132 is no longer aligned and the solid surfaces of the valve ball 124 prevent fluid flow through the valve body 102. FIGS. 3 and 4 provide a perspective and cross-sectional views, respectively, of the valve ball 124, valve seats 126, valve stem 128 and position stop 130.

Figure 5:
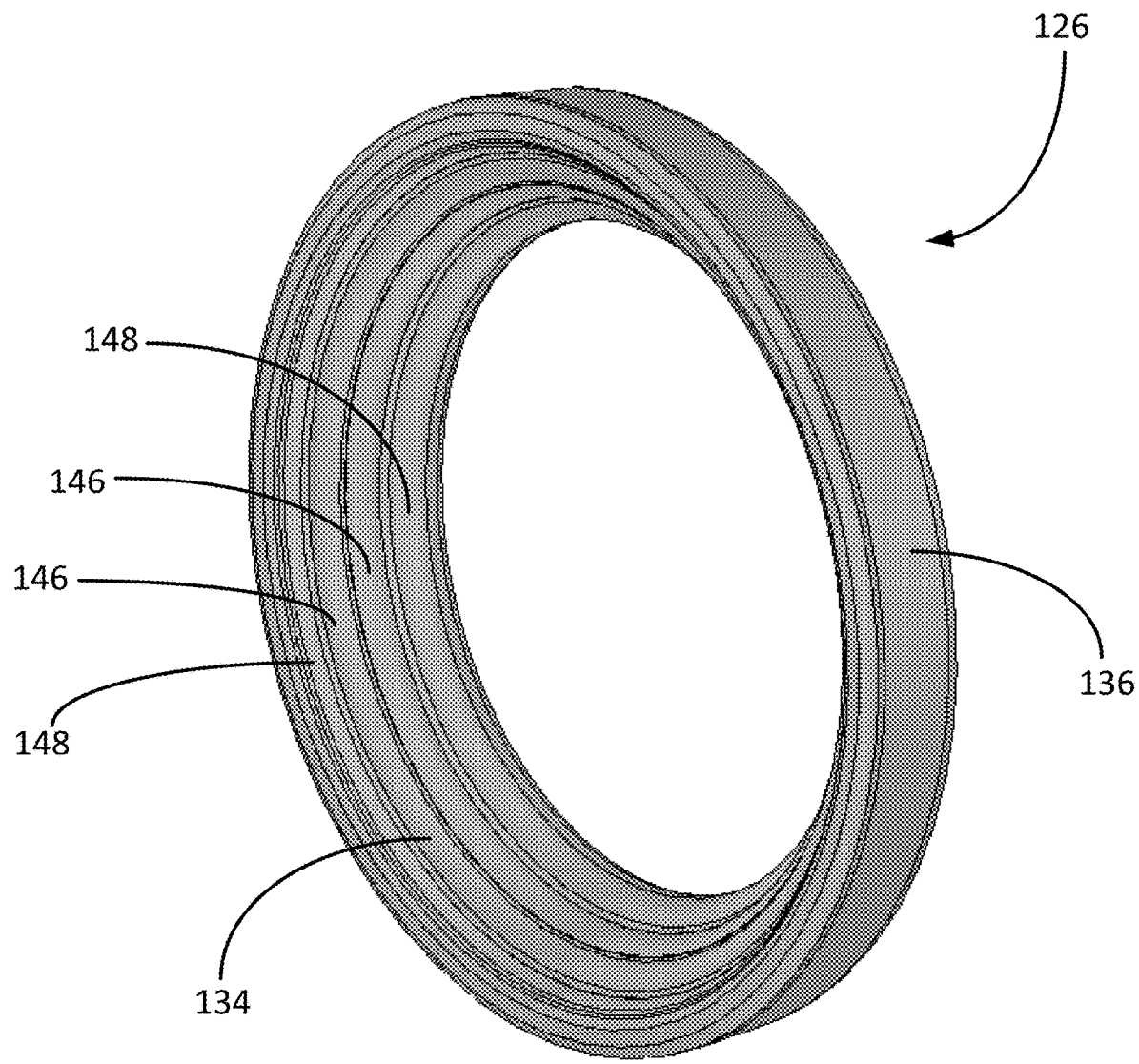
FIG. 5 is a perspective view of a valve seat.
Figures 6, 7:
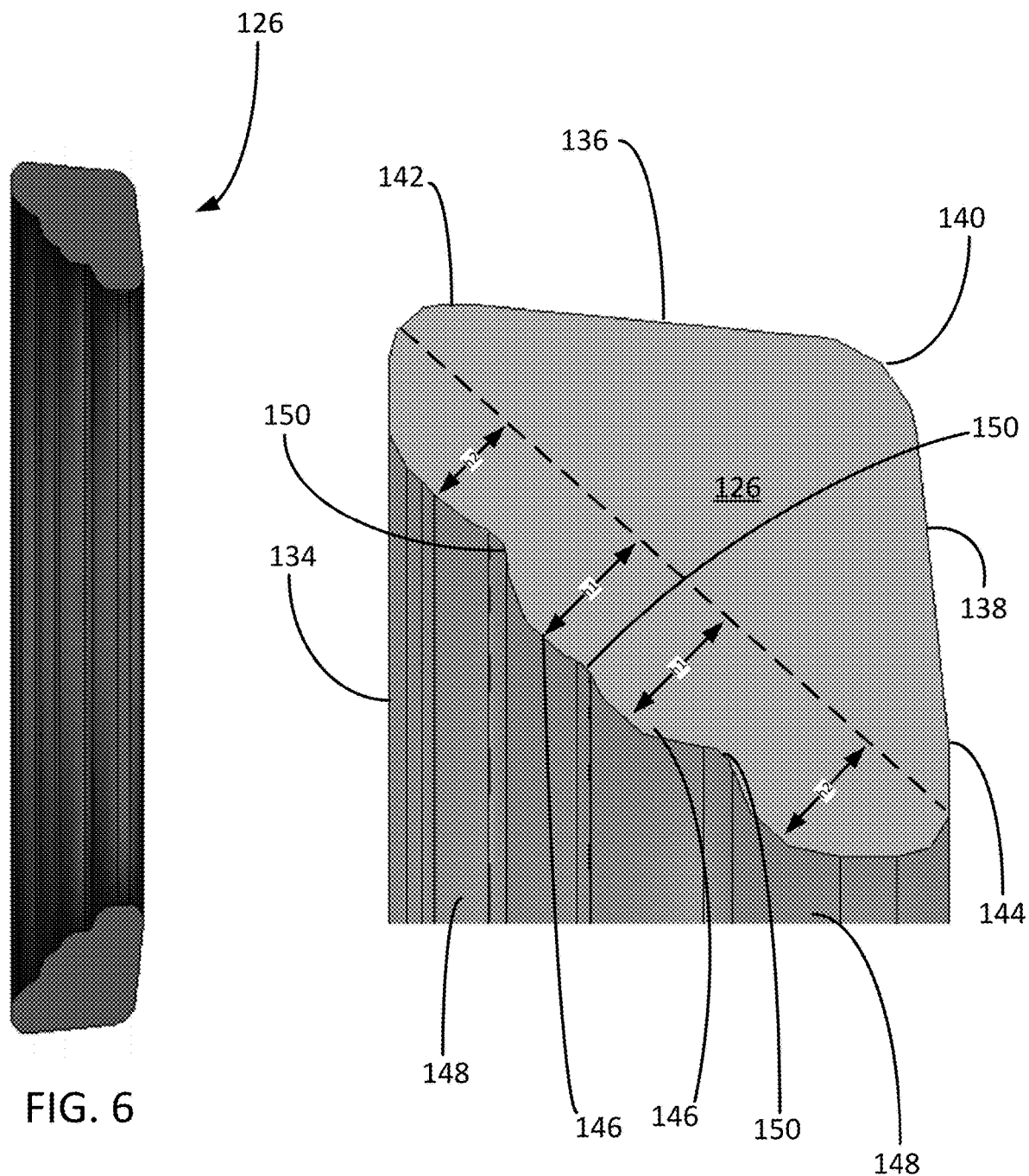
FIG. 6 is a cross-sectional view of the valve seat of FIG. 5.
FIG. 7 is a close-up view of the cross-section of the valve seat of FIG. 5.

Turning to FIGS. 5-7, shown therein are perspective and cross-sectional views of one of the valve seats 126. As noted in FIG. 5, the valve seat 126 is a substantially toroidal form that includes a generally triangular cross-section that has a front sealing face 134, an outer face 136 and a rear face 138 noted in FIG. 7. In exemplary embodiments, the valve seat 126 is manufactured from durable natural or synthetic engineered polymers or thermoplastics. Suitable plastic materials include Acetal, Nylon, PTFE, PFA, PEEK as well as elastomers such as FKM and Buna-N. The valve seats 126 can be formed by extrusion, molding, machining and additive manufacturing processes.

The outer face 136 and rear face 138 extend from a common rear corner 140 to opposite ends of the front face 134. In the embodiment depicted, the outer face 136 and rear face 138 extend from the rear corner 140 at an obtuse angle. The outer face 136 and rear face 138 intersect the front face 134 acute angles. In this way, the outer face 136 and rear face 138 together present a cross section that is slightly incongruent and offset from the substantially square valve seat pockets 116, 118 such that the rear corner 140 is held off the interior corner of the valve seat pockets 116, 118 (as illustrated in FIG. 2). With this geometry, the outer face 136 has an outer face contact zone 142 that is near the front face 134 and spaced apart from the corner 140. The rear face 138 has a rear face contact zone 144 that is near the opposite side of the front face 134 and spaced apart from the corner 140.

As shown in FIG. 2, under normal conditions, the valve seats 126 contact the valve seat pockets 116, 118 at the outer face contact zone 142 and rear face contact zone 144, thus creating a small void behind the valve seat 126. Particulate solids that pass near the outer face contact zone 142 and rear face contact zone 144 are isolated from the void behind the valve seat 126 to prevent accelerated wear on the front face 134 of the valve seat 126 and to prevent damage to the seat pockets 116 and 118. In exemplary embodiments, the valve seat 126 has a size and thickness that causes the valve seat 126 to be slightly compressed between the low pressure contact rings 146 and the outer and rear face contact zones 142, 144 when the ball valve 100 is in the open condition. The geometry and elastic construction of the valve seat 126 produce a spring force that acts against the valve ball 124.

The front face 134 is uniquely contoured to provide enhanced sealing under a variety of pressures. The front face 134 includes at least two low pressure contact rings 146, at least two high pressure contact rings 148 and three or more channels 150. In the embodiment depicted in FIGS. 5-7, the valve seat 126 includes a pair of low pressure contact rings 146 that are surrounded by a pair of high pressure contact rings 148. In the embodiments depicted in FIGS. 5-7, the low pressure contact rings 146 extend from the front face 134 by a first height (h1). The high pressure contact rings 148 extend from the front face 135 by a second height (h2) that is less than the first height (h1). In other embodiments, the high pressure contact rings 148 are disposed between low pressure contact rings 146. In yet other embodiments, the low pressure contact rings 146 and high pressure contact rings 148 are positioned in an alternating fashion on the front face 134 of the valve seat 126.

As shown in FIG. 7, the low pressure contact rings 146 and high pressure contact rings 148 have a rounded apex that provides a line-focused point of contact against the valve ball 124 that multiplies the sealing pressure produced by the front face 134. In exemplary embodiments, the low pressure contact rings 146 and high pressure contact rings 148 are formed as a unitary part of the valve seat 126.

The channels 150 are formed between each of the high pressure contact rings 148 and low pressure contact rings 146. The channels 150 in the front face 134 are swept or contoured without edges to reduce the risk of particulate entrapment, which may accelerate surface degradation of the ball seal. In the event of particulate entrapment, the recessed surface of the channels 150 ensure that particulates are isolated from the sealing rings 146 and 148. This reduces the risk of damage to the low and high pressure contact rings 146, 148. The particulates can be flushed from the channels 150 in the valve seat 126 during subsequent articulation of the valve ball 124.

Figure 8:
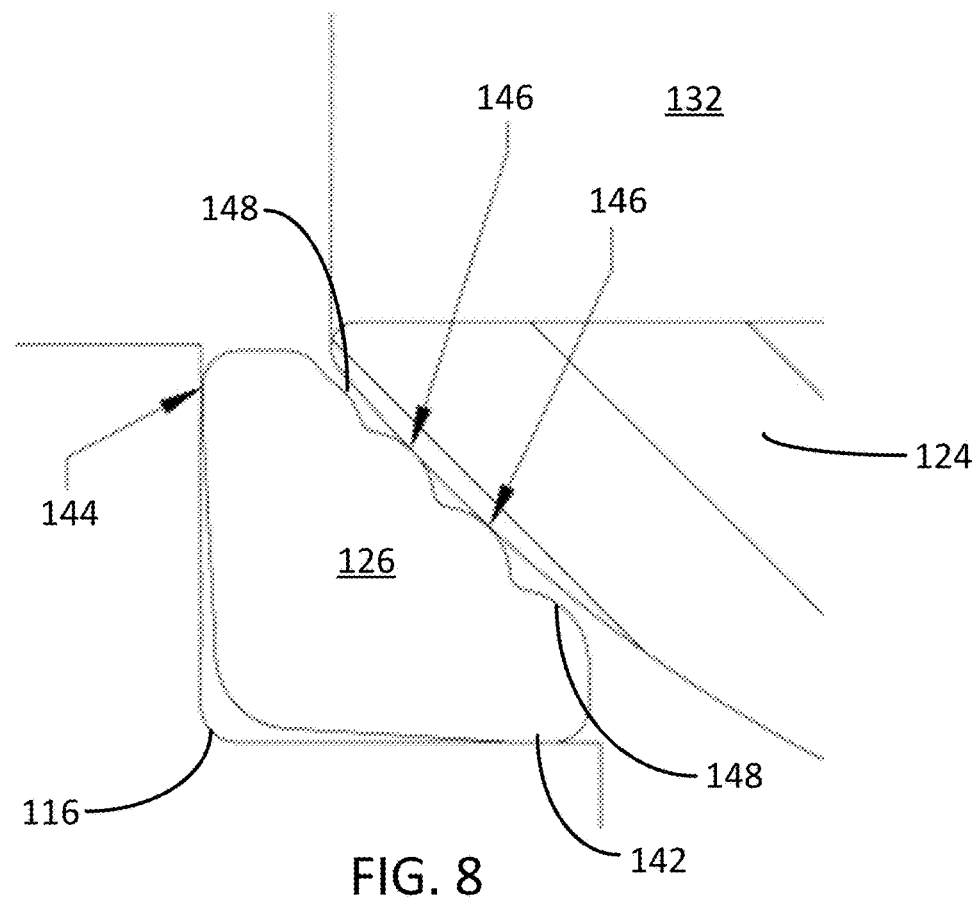
FIG. 8 is a cross-sectional view of the engagement of the upstream valve seat and valve ball in an open condition.
Figure 9:
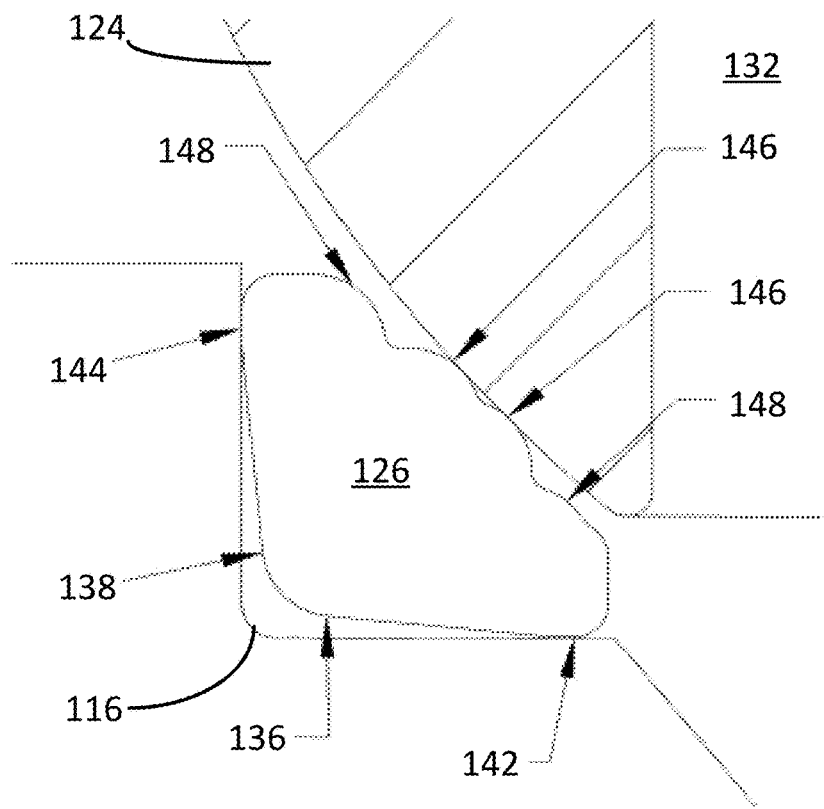
FIG. 9 is a cross-sectional view of the engagement of the upstream valve seat and valve ball in a closed condition.
Figure 10:
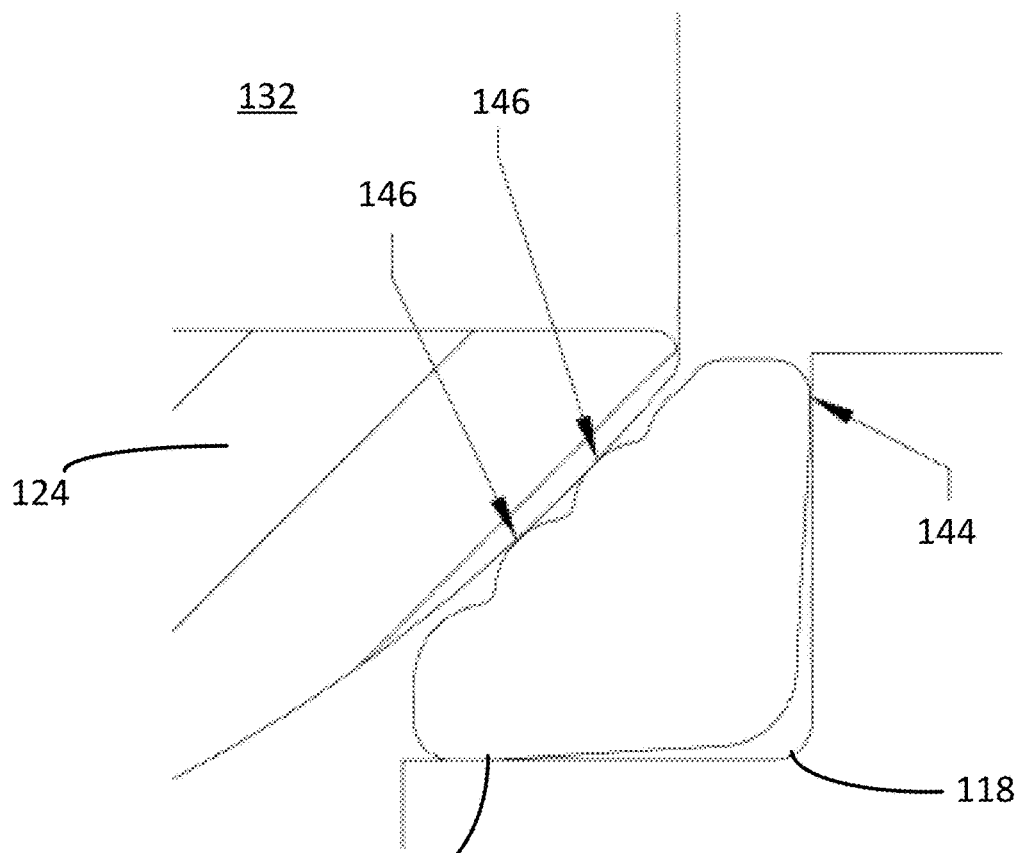
FIG. 10 is a cross-sectional view of the engagement of the downstream valve seat and valve ball in an open condition.
Figure 11:
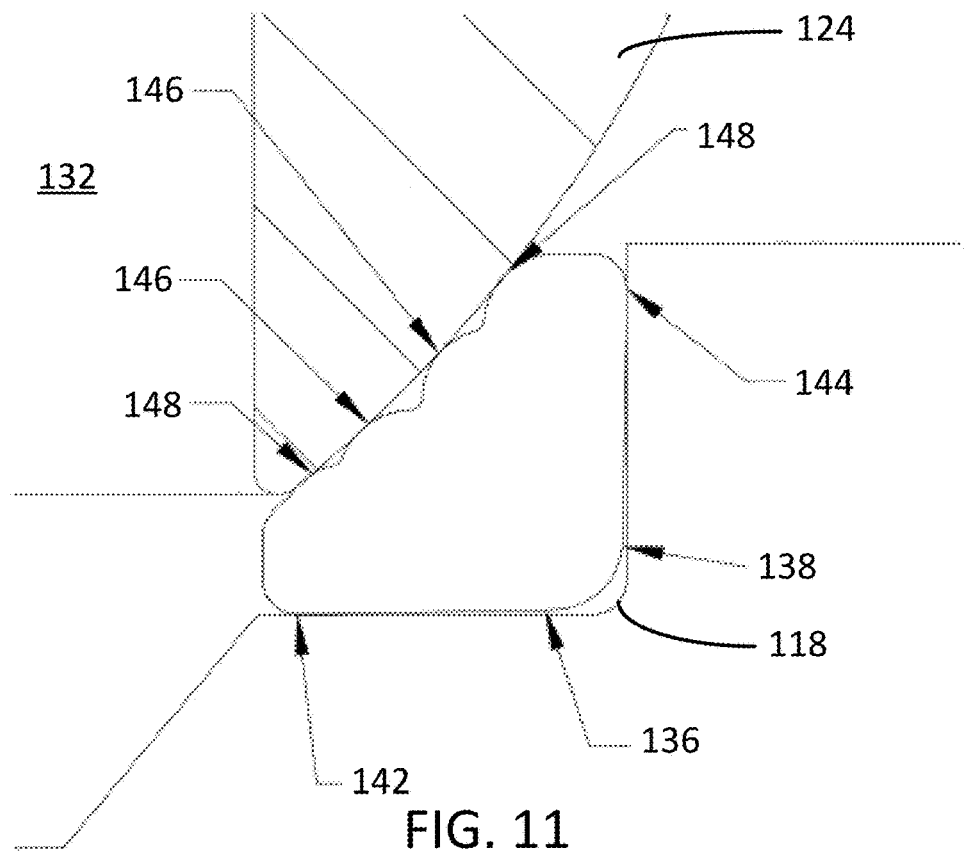
FIG. 11 is a cross-sectional view of the engagement of the downstream valve seat and valve ball in a closed condition.

Turning to FIGS. 8-11, shown therein are top, cross-sectional depictions of the engagement between the valve seats 126 and the valve ball 124 under various pressure conditions caused by the opening and closing of the valve ball 124. FIG. 8 depicts the upstream valve seat 126 and valve ball 124 when the ball valve 100 is in an open condition. FIG. 9 depicts the same valve seat 126 when the ball valve 100 is in the closed position. FIG. 10 depicts the downstream valve seat 126 and valve ball 124 when the ball valve 100 is in an open condition. FIG. 11 depicts the downstream valve seat 126 when the ball valve 100 is in the closed position and deflected against the downstream valve seat 126 under pressure.

In the open condition depicted in FIG. 8, the outer face contact zone 142 and rear face contact zone 144 support the valve seat against the upstream valve seat pocket 116 such that a small void is formed behind the rear corner 140 of the valve seat 126. The low pressure contact rings 146 of the valve seat 126 are in contact with the valve ball 124 to prevent fluid flow around the valve ball 124.

In FIG. 9, the ball valve 100 has been closed. In this condition, the valve ball 124 tends to deflect downstream in response to the application of upstream pressure. The valve seat 126 within the upstream valve seat pocket 116 remains in a relatively uncompressed state as the ball valve 100 is closed. Unlike prior art valve seats, however, the contoured front face 134 of the valve seat 126 remains in contact with the valve ball 124 and seat pocket 116 at seal zones 142 and 144 under this condition, thereby preventing leakage around the valve ball 124 and isolating the seat pocket 116 from particulates while the ball valve 100 is closed. The low pressure contact rings 146 provide a focused application of pressure against the valve ball 124 that enhances the sealing action of the valve seat 126, even when the valve seat 126 is not exposed to elevated pressures.

An important feature of the upstream seat 126 is the ability to automatically release pressure under high pressure conditions. The enhanced sealing created by engagement of the high pressure and low pressure contact rings 148, 146 with the valve ball 124 may increase the torque required to articulate valve ball 124, particularly when the upstream valve seat 126 is exposed to elevated pressures. To reduce the torque demands under these conditions, the upstream valve seat 126 is configured flex away from the valve ball 124 at the low pressure contact rings 146, thereby allowing bypass of the highly pressurized fluid around the face of the valve seat 126. In the event pressurized fluid bypasses the rear face contact zone 144 and pressurizes the seat pocket 116, the valve seat 126 is designed to flex away from the seat pocket 116 at the outer face contact zone 142 to provide a secondary path of bypass for the highly pressurized fluid. These features are specific to the valve seat 126 in the upstream valve seat pocket 116.

Turning to FIGS. 10 and 11, shown therein are view of the valve seat 126 in the downstream valve seat pocket 118 when the ball valve 100 is in open and closed conditions, respectively. In the low-pressure condition depicted in FIG. 10, the low pressure contact rings 146 of the valve seat 126 are in contact with the valve ball 124 to prevent fluid flow around the valve ball 124. The outer face contact zone 142 and rear face contact zone 144 support the valve seat against the downstream valve seat pocket 118 to prevent leakage around the rear face 138 and outer face 136 of the valve seat. The redundant dual-sealing is advantageous to the longevity of the ball valve 100.

In FIG. 11, the ball valve 100 has been closed and the upstream pressure has forced the valve ball 124 to deflect downstream within the ball chamber 120. In response to the increased force produced by the valve ball 124, the valve seat 126 begins to compress into the downstream pocket 118. As the low pressure contact rings 146 compress, the high pressure contact rings 148 contact the valve ball 124 to improve the seal between the valve ball 124 and valve seat 126. The outer face contact zone 142 and the rear face contact zone 144 also enlarge as the valve seat 126 is pressed into the downstream pocket 118. In the fully compressed state, the valve seat 126 provides four redundant seal rings at 146 and 148 on the front face 134 of valve seat 126 and two redundant seal zones at 142 and 144 on the downstream seat pocket 118, thus substantially improving reliability.

Thus, the variable contact rings of the valve seat 126 provide enhanced sealing against the valve ball 124 under both low and high compression in bidirectional ball valves. It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A ball valve comprising:
   a valve body;
   a ball chamber within the valve body;
   a valve ball within the ball chamber, wherein the valve ball comprises:
      an outer surface; and
      a central port extending through the valve ball; and
   a valve seat in contact with the outer surface of the valve ball, wherein the valve seat comprises:
      a front face, wherein the front face includes:
         two or more low pressure contact rings and two or more high pressure contact rings, wherein each of the low pressure contact rings and high pressure contact rings comprises a rounded apex; and
         a plurality of channels, wherein each of the plurality of channels is located between a corresponding pair of adjacent low pressure contact rings or high pressure contact rings, and wherein each of the plurality of channels has rounded profile without edges;
      a rear face; and
      an outer face.

2. The ball valve of claim 1, wherein the front face is toroidal and in contact with the outer surface of the valve ball.

3. The ball valve of claim 1, wherein the outer surface of the valve ball is substantially spherical.

4. The ball valve of claim 1, wherein the valve seat includes a rear corner and wherein the rear face and the outer face intersect one another at an obtuse angle in a cross-sectional view of the valve seat.

5. The ball valve of claim 1, wherein the two or more low pressure contact rings extend from the front face by different extents.

6. The ball valve of claim 1, wherein the two or more high pressure contact rings extend from the front face by different extents.

7. The ball valve of claim 1, wherein the front face meets the rear face at an acute angle in a cross-sectional view of the valve seat.

8. The ball valve of claim 1, wherein the front face meets the outer face at an acute angle in a cross-sectional view of the valve seat.

9. The ball valve of claim 1, wherein the front face meets the rear face and outer face at acute angles in a cross-sectional view of the valve seat.

10. The ball valve of claim 1, wherein the two or more low pressure contact rings extend from the front face by a first extent.

11. The ball valve of claim 10, wherein the two or more high pressure contact rings extend from the front face by a second extent that is less than the first extent.

12. A ball valve comprising:
a valve body;
a ball chamber within the valve body;
a valve ball within the ball chamber, wherein the valve ball comprises:
an outer surface; and
a central port extending through the valve ball; and
a valve seat in contact with the outer surface of the valve ball, wherein the valve seat comprises:
a front face, wherein the front face includes;
at least one low pressure contact ring and at least one high pressure contact ring, wherein the at least one low pressure contact ring and at least one high pressure contact ring extend off the front face at different heights and wherein each of the low pressure contact rings and high pressure contact rings comprises a rounded apex; and
a plurality of channels, wherein each of the plurality of channels is located adjacent to a corresponding one of the at least one low pressure contact ring and at least one high pressure contact ring, and wherein each of the plurality of channels has rounded profile without edges;
a rear face; and
an outer face.

13. The ball valve of claim 12, wherein the front face is toroidal and in contact with the outer surface of the valve ball.

14. The ball valve of claim 12, wherein the valve seat includes a rear corner and wherein the rear face and the outer face intersect one another at an obtuse angle in a cross-sectional view of the valve seat.

15. The ball valve of claim 12, wherein the front face includes two or more low pressure contact rings.

16. The ball valve of claim 12, wherein the front face includes two or more high pressure contact rings.

17. The ball valve of claim 12, wherein the front face meets the rear face and the outer face at acute angles in a cross-sectional view of the valve seat.

18. A ball valve comprising:
a valve body, wherein the valve body comprises:
a ball chamber;
an upstream valve seat pocket; and
a downstream valve seat pocket;
a valve ball within the ball chamber, wherein the valve ball comprises:
an outer surface; and
a central port extending through the valve ball; and
an upstream valve seat in the upstream valve seat pocket and in contact with the outer surface of the valve ball, wherein the upstream valve seat comprises:
a front face, wherein the front face includes:
two or more low pressure contact rings, two or more high pressure contact rings, wherein each of the two or more low pressure contact rings and two or more high pressure contact rings comprises a rounded apex;
a rear face;
an outer face; and
a rear corner, wherein the rear face and the outer face intersect one another at an obtuse angle in a cross-sectional view of the valve seat, and wherein the rear corner is spaced apart from the upstream valve seat pocket.

19. The ball valve of claim 18 further comprising a downstream valve seat in the downstream valve seat pocket and in contact with the outer surface of the valve ball, wherein the downstream valve seat comprises:
a front face, wherein the front face includes two or more low pressure contact rings, two or more high pressure contact rings;
a rear face;
an outer face; and
a rear corner, wherein the rear face and the outer face extend away from the rear corner at an obtuse angle in a cross-sectional view of the valve seat, and wherein the rear corner is spaced apart from the downstream valve seat pocket.

* * * * *